Nov. 7, 1933.  J. M. CUNNINGHAM  1,933,714
MULTIPLYING MACHINE AND CYCLE CONTROLLER THEREFOR
Filed April 21, 1932  11 Sheets-Sheet 1
FIG. 2.
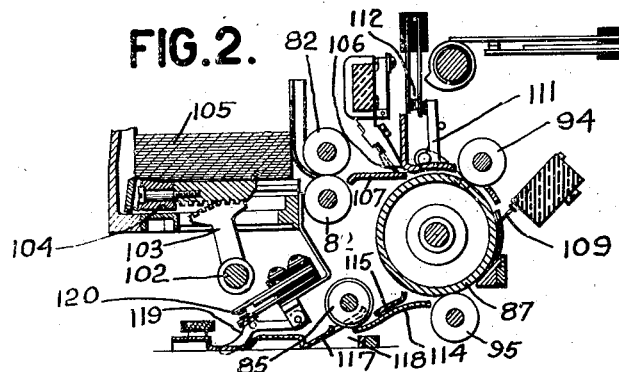
FIG. 1.
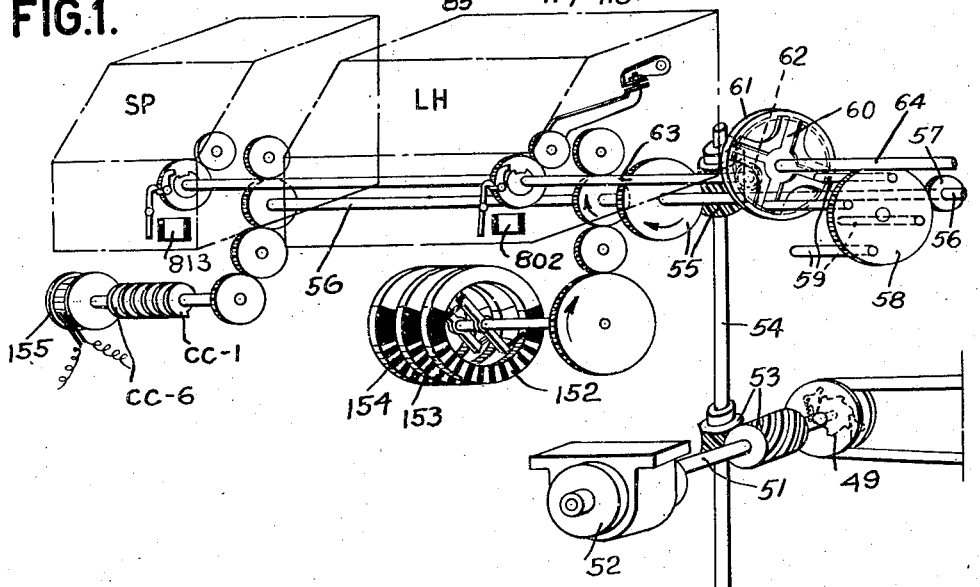
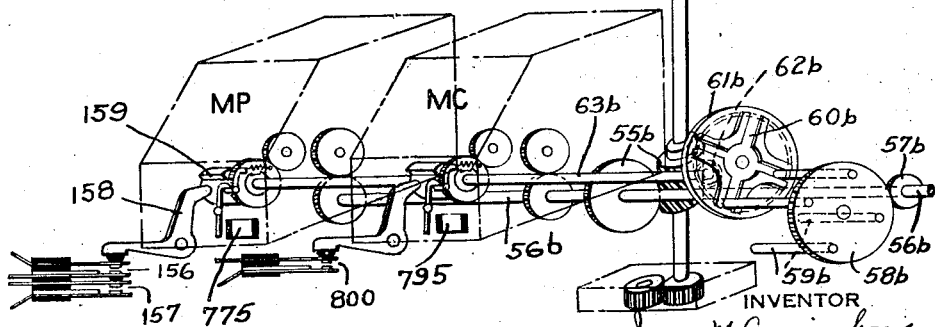
INVENTOR
James M. Cunningham
BY
Cooper, Kerr & Dunham
ATTORNEYS Nov. 7, 1933.　　　J. M. CUNNINGHAM　　　1,933,714
MULTIPLYING MACHINE AND CYCLE CONTROLLER THEREFOR
Filed April 21, 1932　　11 Sheets-Sheet 2
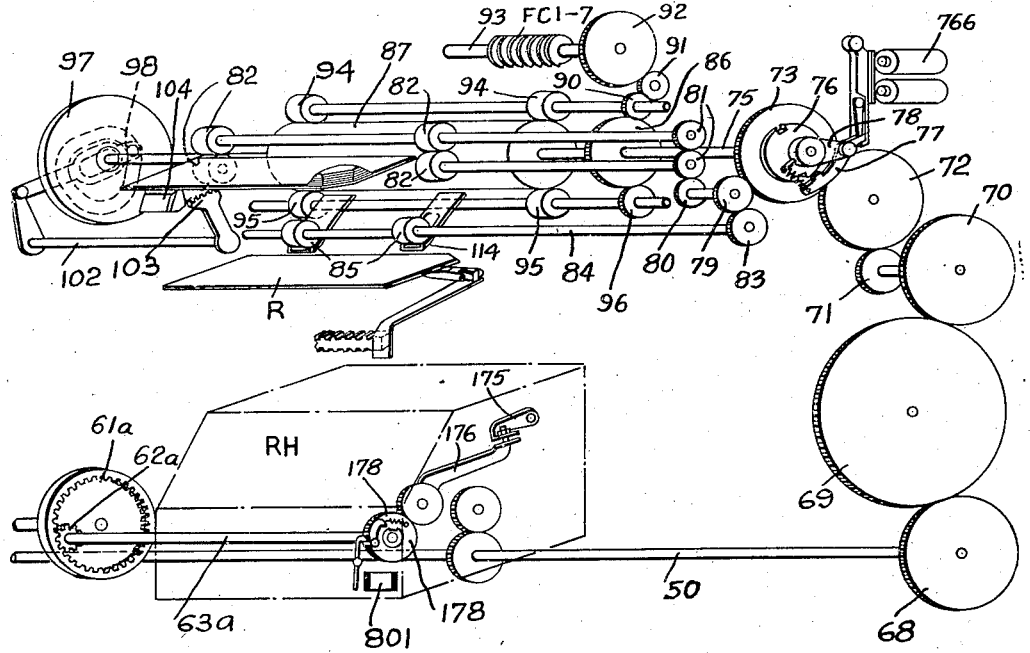
FIG.1a.
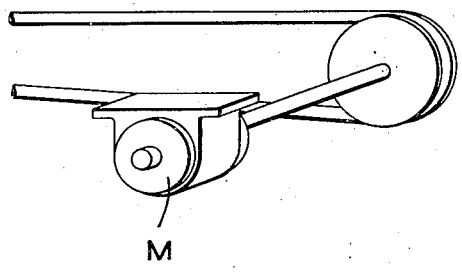
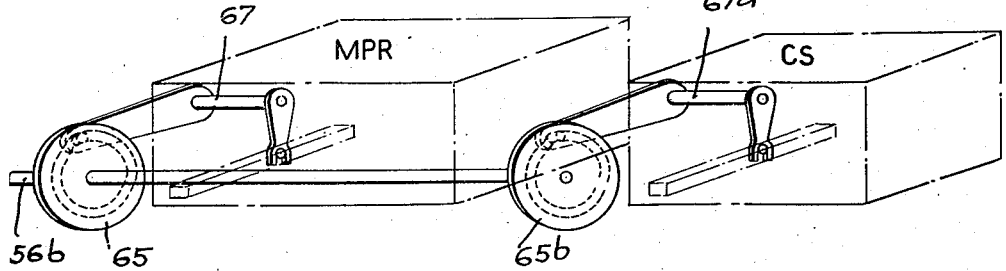
INVENTOR
James M. Cunningham
BY
Cooper, Kerr & Dunham
ATTORNEYS Nov. 7, 1933.  J. M. CUNNINGHAM  1,933,714
MULTIPLYING MACHINE AND CYCLE CONTROLLER THEREFOR
Filed April 21, 1932   11 Sheets-Sheet 3

INVENTOR
James M. Cunningham
BY
Cooper, Kerr & Dunham
ATTORNEYS

Nov. 7, 1933.   J. M. CUNNINGHAM   1,933,714
MULTIPLYING MACHINE AND CYCLE CONTROLLER THEREFOR
Filed April 21, 1932   11 Sheets-Sheet 4
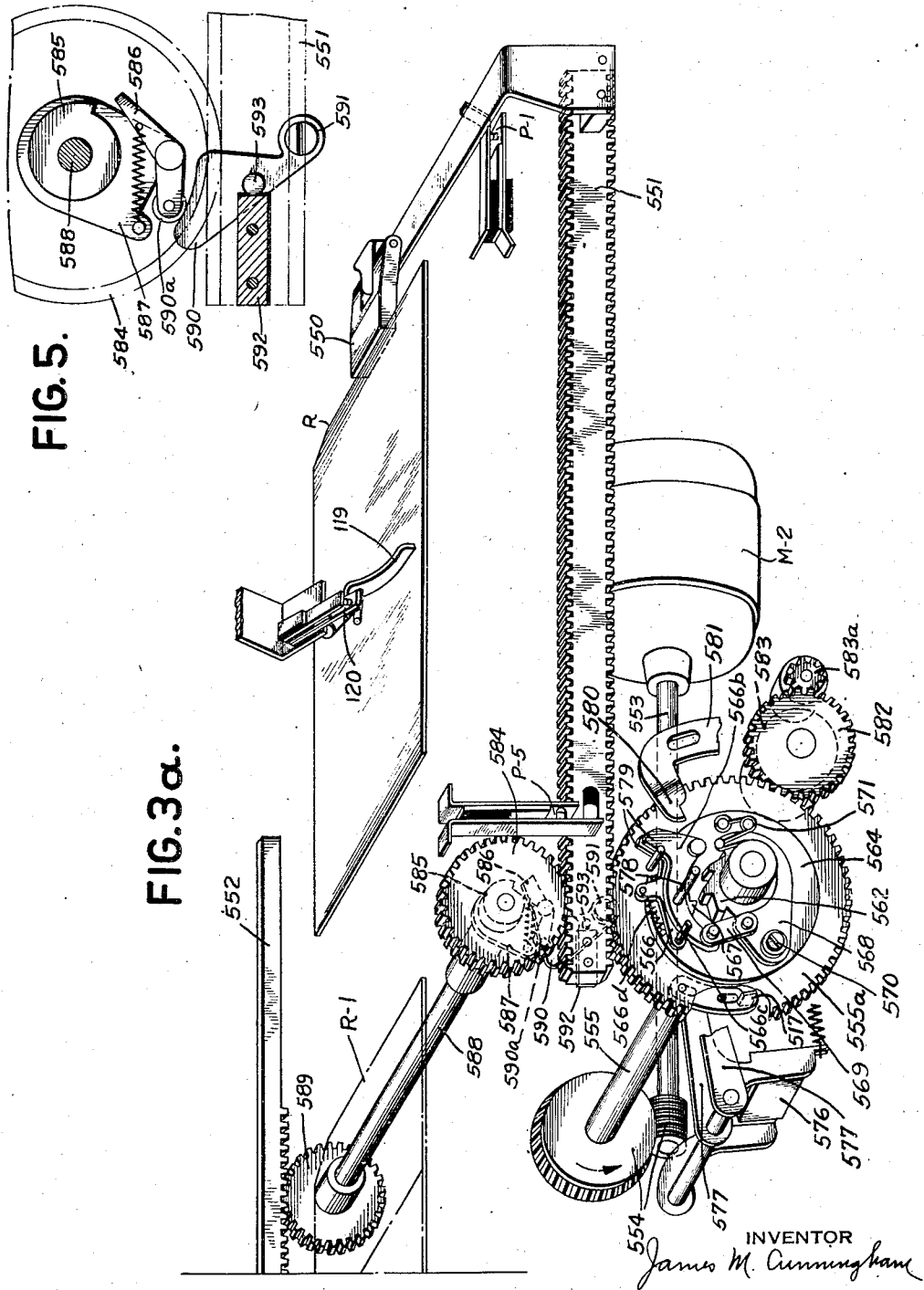

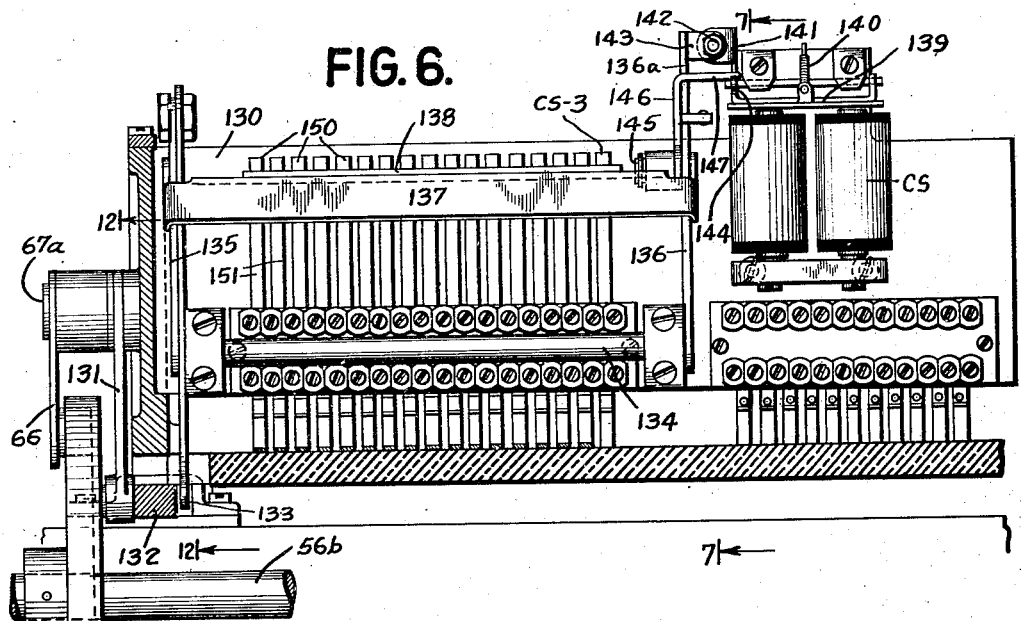

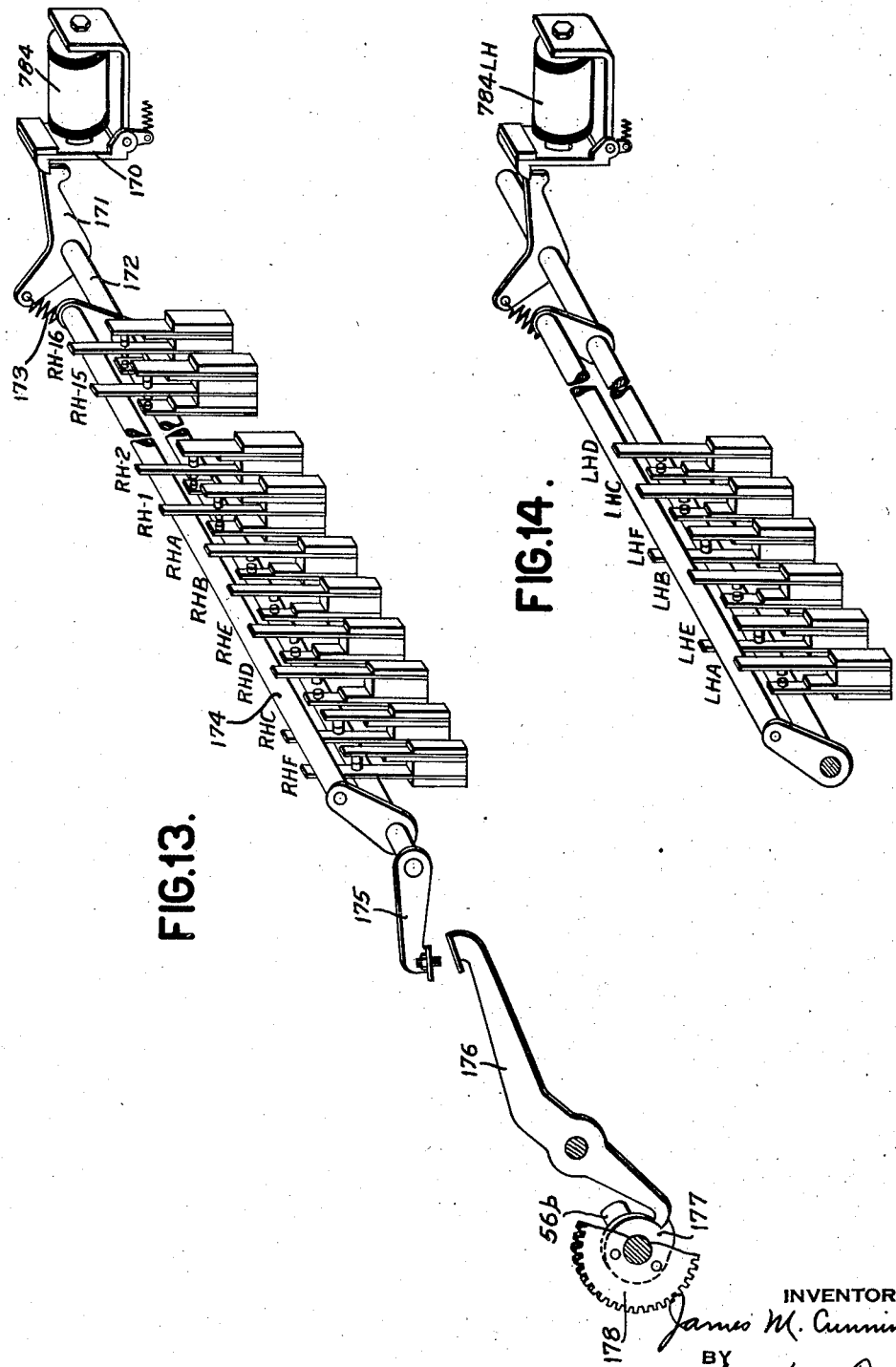

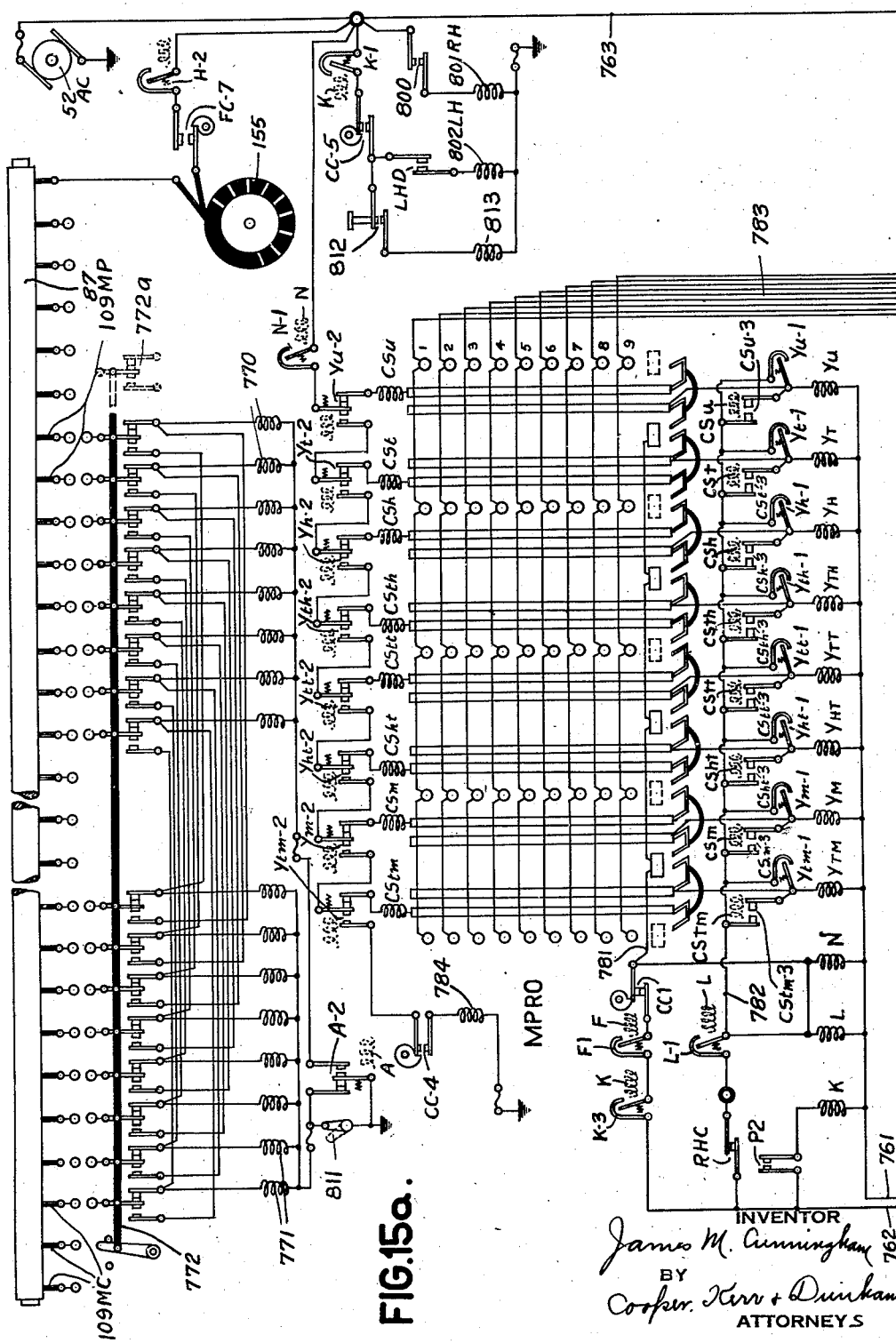

Patented Nov. 7, 1933

1,933,714

UNITED STATES PATENT OFFICE 1,933,714

MULTIPLYING MACHINE AND CYCLE CONTROLLER THEREFOR

James M. Cunningham, Endicott, N. Y., assignor, by mesne assignments, to International Business Machines Corporation, New York, N. Y., a corporation of New York Application April 21, 1932. Serial No. 606,585

15 Claims. (Cl. 235—92)

This invention relates to improvements in multiplying machines. More particularly the present invention relates to improvements in the machine shown and described in the copending application of George F. Daly and James M. Cunningham, Serial No. 576,184, filed November 19, 1931 and also to improvements in certain features of the machine shown and described in the copending application of James W. Bryce and George F. Daly, Serial No. 606,132 filed April 19, 1932.

The principal objects of the present invention reside in the provision of an improved cycle controller or zero column skipping device for multiplying machines. A further object of the present invention resides in the provision of a cycle controller or column skipping control device which is simpler and more rapid in operation than previous controllers and which furthermore is of a form which is adaptable for extension to any desired number of columns of the multiplier.

A further object of the present invention resides in the provision of a simplified column shifting device and control therefor and more particularly to the provision of a simplified arrangement of control circuits.

Further objects of the present invention reside in certain improvements and simplifications of various control circuits in the multiplying machine shown and described in the Daly and Cunningham application above referred to.

A further object of the present invention resides in the provision of a multi-contact column shifting arrangement provided with a special extra pair of contacts for column selecting purposes.

A further object of the present invention resides in the provision of a zero column skipping and column shifting arrangement in which the setting up of the controls for one column concurrently effects a selection of controls to be set up for the next desired column.

Further and other objects will be hereinafter set forth in the accompanying specification and claims and shown in the drawings, which by way of illustration show what I now consider to be one and a preferred embodiment of the invention.

In the drawings:

Figures 1 and 1a taken together show a diagrammatic view of the various units of the machine and also show the train of the driving mechanism of the machine;

Fig. 2 is a vertical sectional view taken through the card handling and reading section of the machine;

Figs. 3 and 3a, taken together, show somewhat a diagrammatic view of the punching section of the machine;

Fig. 5 is another detail;

Fig. 6 is a side elevational view of one of the column shift multi-contact relay devices which are used in the machine, which column shift relay device is generally similar in construction to the multiplying panel relay units which are used in the machine;

Fig. 7 is a sectional view taken substantially on line 7—7 of Fig. 6. This view shows the parts in the armature restoring and knocking off position;

Figs. 8, 9, 10 and 11 show positional views of various parts of the column shift relay devices and show the relation of the contacts, the armature latch, etc.;

Fig. 12 is a side elevational view of the operating cam and driving devices for effecting shifting of parts of the column shift relay contact devices. The view is substantially a section taken on line 12—12 of Fig. 6;

Fig. 13 shows an isometric view of certain electro-mechanical contacts or relay contacts in the RH accumulator;

Fig. 14 shows similar contacts in the LH accumulator; and

Figure 3:
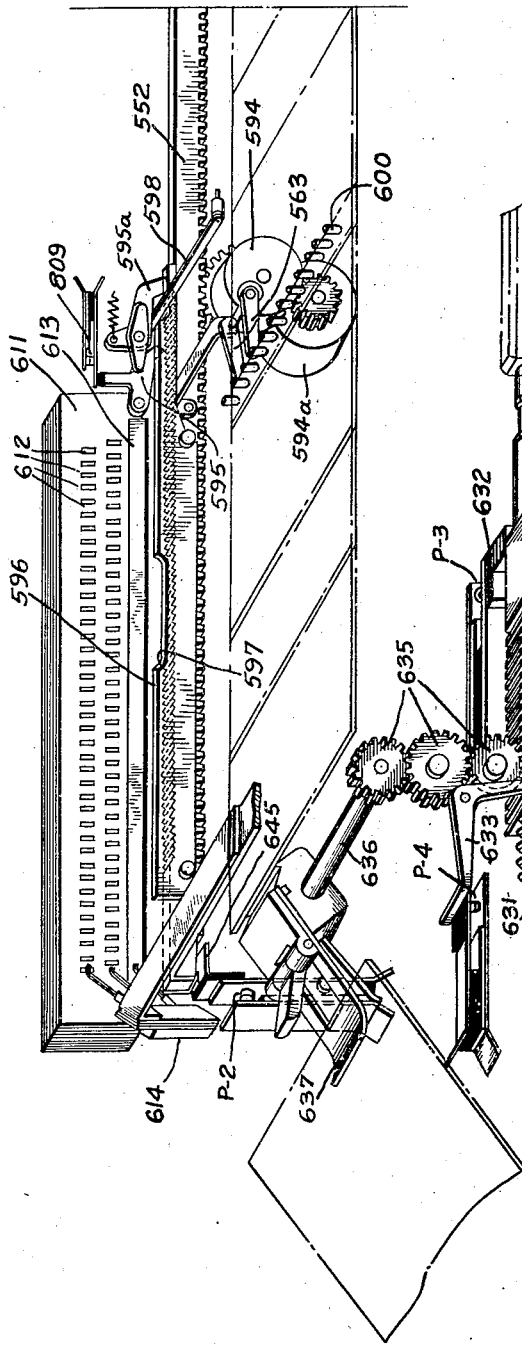

Figs. 15a, 15b, 15c, 15d and 15e, taken together and arranged vertically in the order named, show the complete circuit diagram of the machine.

Before describing the detailed arrangement of the parts of the machine, a general description will be given of the various units and their location in the machine. The machine embodies a card feed and card handling section which is shown in the upper right hand corner of Fig. 1, and also shown in cross-section in Fig. 2. This part of the machine is arranged to feed cards and derive readings therefrom and afterwards pass the cards into a punching section of the machine which is a punch of the successive column punching type. In the present application only a fragment of this punching structure is shown as its details form no part of the present invention.

The counters and receiving devices of the machine are as follows: In the upper part of the machine there are shown an RH accumulator generally designated RH on Fig. 1a and an LH accumulator generally designated LH on Fig. 1. Also shown in the upper part of the machine there is a summary products accumulator designated SP. In the lower part of the machine there are two counters which are used as multiplier and multiplicand entry receiving devices. Such counters or receiving devices are respectively designated MP and MC on Fig. 1.

The machine also includes a multiplying relay unit which is in the lower part of the machine, the same being generally designated MPR. In the lower part of the machine there is also provided a column shift relay unit generally designated CS. In the present embodiment the column shift relay unit is like the multiplying relay unit being of the electromagnetically tripped mechanically controlled multi-contact type. For simplicity of construction the multiplying and column shift multi-contact relays have been assembled in units upon panels, but such construction is not essential.

Machine drive

The machine is adapted to be driven by a constantly running motor M (Fig. 1a). This motor through a belt and pulley drive and ratchet drive 49, drives a shaft 51 (Fig. 1), which shaft drives an A. C. D. C. generator 52. The A. C. end of this generator is adapted to produce the impulses for actuating the various counter magnets and certain of the relay magnets in the machine and this generator 52 has a D. C. (direct current) take-off section. In short, the generator 52 is provided with both slip rings for taking off the A. C. impulses and comutators and brushes for taking off direct current.

Shaft 51 also through the worm gear drive 53 drives a vertical shaft 54 which shaft drives the units in the upper section of the machine and the units in the lower section of the machine. The drive to the units in the upper section will be first described.

Shaft 54 at its upper end through worm gearing 55 is adapted to drive the counter drive shaft 56 of the machine. The various counters are driven from this counter drive shaft in the customary manner. The drive for reset of the counter units is effected in the following manner. Shaft 56 is provided with a spur gear 57 driving a gear 58 with a four to one drive ratio. Gear 58 has extending from it four Geneva pins 59 cooperating with the other or cross element of the Geneva designated 60. Secured to element 60 is an internal gear 61 which gear has cooperating with it a spur gear 62 mounted on the end of the reset shaft 63. The Geneva cross element 60 also has a shaft 64 which extends to another internal gear 61a similar to gear 61 and having cooperating with it an internal gear 62a similar to gear 62 which drives the reset shaft 63a for the RH accumulator unit in the upper right hand part of the machine (see Fig. 1a). The drive for the lower units of the machine is substantially the same as previously described, that is the shaft 54 through the worm gearing 55b drives the lower counter drive shaft 56b. A similar Geneva drive 57b, 58b, 59b and 60b is adapted to drive an internal gear 61b which in turn drives a pinion 62b mounted on the end of the lower reset shaft 63b. The lower reset shaft 63b resets the MP and MC receiving devices in the customary manner. The lower drive shaft 56b also extends to the right and drives an operating-cam 65, which cam is adapted through a follower to actuate a cross shaft 67 and operate certain shifting mechanism for the multiplier panel relay unit contact assemblages. A similar cam 65b is also provided driven from shaft 56b, which cam through a follower is adapted to actuate a cross shaft 67a and operate the shifting mechanism for the column shift relay units of the machine.

Card feed and card handling unit drive

Referring to Fig. 1a the shaft 56 at its extreme right hand end is provided with a gear 68 which through an idler gear 69 drives a gear 70, which through its shaft drives gear 71, which gear 71 in turn drives a gear 72. Gear 72 in turn drives a gear 73, revolubly mounted on shaft 75. Gear 73 has fixed to it one element 76 of a one revolution clutch, the complemental part of which comprises a pawl 77 carried by an arm 78 which is fixed to shaft 75. The one revolution clutch is the customary type used in tabulating machines and this one revolution clutch is engaged by the energization of the usual clutch magnet. With the one revolution clutch engaged, it will be understood that the shaft 75 will rotate in unison with gear 73 and with the one revolution clutch disengaged 73 will continue its rotation and shaft 75 will remain stationary. Gear 73 also drives an intermediate gear 79 which in turn is fixed to a gear 80, which gear 80 drives a train of gears 81, which in turn drive the card feed rolls 82 of the machine. The feed rolls 82 are constantly rotating feed rolls, the same rotating at all times when gear 73 is rotating and at all times when the main counter drive shaft 56 is rotating. Also in train with gear 79 is a gear 83 which gear constantly drives a drag roll shaft 84 having fixed thereto a pair of drag rolls 85.

It will be understood from the foregoing that the card feed rolls 82 and the drag rolls 85 constantly rotate all all times during the operation of the machine when the driving motor is in operation.

The drive of the parts from the intermittent element of the one revolution clutch will now be described.

The shaft 75 has secured to it a gear 86 and also secured to the shaft 75 is a card transfer and contact cylinder 87. As shown, the one revolution clutch element 76 is provided with two notches and the arrangement of this clutch is such that whenever the pawl 77 is engaged, the element 78 of the one revolution clutch will make one complete rotation. Accordingly, whenever the one revolution clutch is engaged the card transfer cylinder will make one complete revolution during two counter cycles. The one revolution clutch pawl 77, however, can be engaged in either of the two notches of the clutch element 76. This relation of the one revolution clutch parts is provided because one counter cycle is required to traverse the cards past the sensing brushes which cooperate with the transferring contact cylinder 87 and another counter cycle is required to deliver the card to the punching station of the machine and provision should be made to permit of immediate clutching engagement of the one revolution clutch even though the counter drive shaft 56 had made an odd number of revolutions after the previous disengagement of the one revolution clutch.

Drive to intermittently actuated contacts

Gear 86 previously mentioned as being fixed to the shaft 75 drives a gear 90, which gear in turn drives an idler gear 91, driving a gear 92 fixed to cam contact drive shaft 93. Shaft 93 has secured upon it a number of cams for actuating contact devices which are generally known as the FC group of cam contacts of the machine.

The arrangement of these cams is such that they make one revolution per card feed cycle in contradistinction to a counter cycle. Fixed to the shaft of gear 90 are card feed rolls 94, which rolls are spring pressed into contact with the card transfer and card contact cylinder 87. Similar spring pressed card feed rolls 95 also cooperate with the transfer contact cylinder 87 and these rolls are driven by a gear 96 in train with gear 86.

It may be here mentioned that the feed rolls 94 and 95 are preferably made of insulating material inasmuch as they at times contact with the transferring contact cylinder 89 which receives current.

*Card picker drive*

Shaft 75 on one end has secured to it a box cam 97, which box cam has a follower 98 cooperating therewith. The cam follower connects to a rock shaft 102, which rock shaft carries gear sector 103. Gear sector 103 is in engagement with the picker block 104 (see Fig. 2). By the engagement of the one revolution clutch the picker is called into action and the advance of the picker withdraws a single card from the magazine 105 (Fig. 2) and advances this card into the bite of the rolls 82. The rolls 82 in turn forward the card to the card transfer roll 87 and intermediate the rolls 82 and the transfer cylinder 87 there is provided an advance card or X brush sensing station which comprises a brush 106 cooperating with the combined contact and card guide plate 107. A curved card guide is provided around the transfer cylinder and the advancing card is carried around by the forward rotation of the transfer cylinder and by the rotation of rolls 94 so as to be traversed under the main card sensing brushes generally designated 109 in Fig. 2. Also in cooperation with the card is a pivoted card lever 111, which lever 111 has a tail portion arranged to bear against the upper surface of the card. With the card in position under this tail of the card lever, contacts 112 will be closed.

After the card has been sensed by the main sensing brushes 109, it is advanced by the cooperation of feed rolls 95 with the transfer cylinder 87 between guiding members 114 and 115. While between these guiding members the card is advanced by the cooperation therewith of the drag rolls 85, such rolls extending downwardly into recesses of the lower members 114 in the manner shown in Fig. 1a. This arrangement of drag rolls and recesses provides for a gripping of the card and an advance of the card after it has been released by the rolls 95 so that the card may be delivered into the tray of the punching section of the machine. The drag rolls 85 (Fig. 2) deliver the card under a guide member 117 (Fig. 2) and after the card has been freed from the drag rolls the card is flipped down into the tray of the punching section of the machine. The location of the tray is generally indicated at 118 in Fig. 2 and the position of the card in this tray is indicated at R in Fig. 1a. A card lever 119 (Fig. 2) is also provided adjacent the tray portion 118 and this card lever is arranged to close card lever contacts 120 when a card is lodged in the tray of the punching section of the machine.

The foregoing description has described the manner in which a card is withdrawn from the supply magazine 105 and the manner in which the card is carried past the advance sensing brush or X brushes 106, the main sensing brushes 109 and the manner in which the card is delivered into the punching section of the machine. With the traverse of the card past the sensing brushes the amount of the multiplier and multiplicand will have been read from the card and entered into the MP receiving device and into the MC receiving device.

The MP receiving device, the MC receiving device and the LH and RH accumulators, the SP accumulator are of the usual type as customarily used in tabulating machines and are provided with electromagnetically actuated clutches. The MP and MC receiving devices have commutator type readout devices and the LH and RH accumulators also have commutator type readout devices.

*Multiplying relays*

The multiplying relays used in this machine are those of the type customarily used in electric multiplying machines of this general type and which are fully described in the copending application of George F. Daly and James M. Cunningham, Serial No. 576,184, filed November 19, 1931. It is sufficient to here state that the multiplying relays are substantially similar in construction to the multi-contact relays which are used for column shift purposes and which will now be more fully described.

*Column shift relays*

Suitable frame plates in the machine (see Fig. 6) are slotted to receive a number of vertical plates 130. Carried on each plate is a magnet which will be generally designated CS. These magnets when energized serve to control the release of multi-contacts in the column shift relay section of the machine. Preferably the magnets CS are used as trip magnets only and the armatures of these magnets are not required to actually shift their related contacts. Furthermore, provision is made for relieving the strain from the armature latches at the time of release of the armature latches.

It has been previously explained that a cam 65b (Fig. 1a) is provided on shaft 56b and this cam cooperates with a follower 66 secured to cross shaft 67a which shaft at its opposite end is provided with an arm 131 which has a forked end cooperating with a stud on a serrated operating bar 132. The serrated operating bar (see Fig. 6) is slidably mounted and disposed below and at one side of the base of the controlling relay section of the machine and into the serrations of this bar extend arms 133 of a contact operating bail structure. Each arm 133 is fixed to the end of a shaft 134 which is suitably journaled in brackets carried by the plate 130. Fixed to shaft 134 at its opposite ends are upstanding arms 135 and 136. Arm 135 is also fixed to arm 133 and spanning 135 and 136 and fixed thereto is a cross member 137 which on its upper surface carries a strip or bail of insulating material 138 (see Figs. 7 and 8). Arm 136 extends upwardly beyond 137 and this upward extending portion of 136 will be designated 136a. Arm 136a is utilized for knocking off the armatures and it also controls certain of the latching operations as will now be described. The magnet generally designated CS is provided with a pivotally mounted armature 139 which is spring retracted away from the magnet by spring 140. The armature 139 also is provided with an upstanding portion 141 (see Fig. 7) which portion is in alignment with a screw 142 carried by bent over portion 143 of arm 136a.

By referring to Fig. it will be noted that if the serrated operating bar 132 is in the position shown, that arm 131 will be rocked in a clockwise direction swinging arm 136a clockwise causing the screw 142 to abut against 141 and restore and knock off any previously attracted armature. Each armature 139 is provided with a latch portion 144 and pivotally supported upon member 136a upon a stud 145 is a forked member 146. As shown in Fig. 6 the forked member 146 is disposed to the left of the arm 136a and the forks of this member 146 are turned over and pass the sides of 136a. One of these forked portions is designated 147 on Fig. 6 and this forked portion extends over and cooperates with the latch point 144 on armature 139. The other fork 148 is disposed upon the opposite side of member 136a. A spring 149 is provided which is fastened at one end to the right hand fork 148 of the forked member 146, which spring is also fastened to the arm 136a. The action of spring 149 is such that it tends to rock the forked member 146 anticlockwise with respect to 136a. After the armature has been restored and knocked off in the manner indicated in Fig. 7, the serrated operating bar 132 by its cam action is shifted slightly to the right (note the arrows at the bottom of Fig. 8). Shifting of the serrated operating bar 132 to the right allows arms 133 to follow the serrated operating bar. Such following action is brought about by the spring pressure of the set of contact blades 150. This slight movement of 131 to the right swings 136a slightly to the left to a position in which there is still clearance between part 147 and member 136a. With the parts in this position the spring strain of contacts 150 is removed from the latch point 144. The latch may now be released by attracting the armature by energizing the magnet CS. Upon energization of the magnet CS the action of spring 149 causes the forked arm 147 to snap over the top of the latch point 144, the parts now taking the position shown in Fig. 9. The next action is the actual closing of contacts 150 with 151. This is the position of parts shown in Fig. 10. With this condition of parts the cam 65b has turned to a further extent permitting a further shifting of the serrated operating bar 132. The arm 133 then swings to its extreme clockwise position under the action of springs 150. The insulating bail 138 moves to the left and allows contacts 150 and 151 to close.

The further operation comprises the knocking off the armatures as shown in Fig. 7 by the movement of the serrated bar 136 to the left. The movement of this bar positively opens up contacts 150 and 151 against the tension of the blades 150.

Fig. 11 shows the relation of parts upon an operation when no trip of an armature has been effected magnetically. In this case the latching nose 144 cooperates with the forked arm 147 and prevents 136a swinging to the left beyond the latching point. It will be noted that 136a in this figure is in contact with the right hand side of 147. With this position of the parts the contacts 150 and 151 will be kept open.

Summarizing the above multi-contact relays arrangement provides the following desirable features.

Contact pressure is removed from the latch point prior to the releasing of the latch magnetically. The multiple contacts are opened by a positive mechanical action of the serrated operating bar. The armatures are positively knocked off by a positive cam operation of the serrated operating bar. The timing of contact closure under the Fig. 7 condition can be definitely controlled by the timing of the cam 65.

Summarizing the construction provides accurate timing of contact operation with very slight load on the latch points at the time of armature actuation under energization of the control magnets CS.

It will be understood that in the present machine there are a number of these multi-contact relays. In the present embodiment eight of such assemblages are employed for column shifting actions.

The machine also includes a number of emitters of conventional construction, an impulse distributor and a number of CC cam contact devices. The emitters are shown at 152, 153 and 154 (Fig. 1) and such emitters are driven from the main counter drive shaft 56 in the conventional manner. Also shown on Fig. 1 are a number of cams for operating the CC group of cam contacts, these will be designated CC—1 to CC—6 inclusive corresponding to the showing on the circuit diagram. Adjacent the C cams and driven concurrently therewith is an impulse distributor or timer 155. Certain contacts are associated with the MP receiving device and arranged to be shifted whenever the MP receiving device is reset. Such contacts are respectively designated 156 and 157 (Fig. 1) and such contacts are operated by a member 158 which cooperates with the cam 159 fixed to the reset drive gear of the MP receiving device.

*Electro-mechanical relays in the RH and LH accumulators*

Fig. 13 shows relay devices in the RH accumulator. These relay devices comprise sixteen three-bladed contacts designated RH 1 to 16 inclusive and two-blade contacts RHA, RHB, RHC, RHD, RHE and RHF, of these latter contacts RHA, RHB, RHD and RHE are normally open contacts and RHC and RHF are normally closed contacts. The contacts are released to shift to reverse position by energization of magnet 784, which when energized trips armature 170, releasing 171 and allowing bail shaft 172 to rock under the influence of spring 173. The bail 174 upon clearing the contacts allows the same to shift.

Restoration of the contacts and relatching of 171 with 170 is effected by a train of levers extending to a cam on the reset gear of the RH accumulator. These levers comprise a lever 175 fixed to the bail shaft which cooperates with a lever 176 having its opposite end cooperating with a cam 177 upon the reset gear 178 of the RH accumulator.

The LH accumulator is provided with contacts which are similarly operated. The contacts proper are shown in Fig. 14 and comprises normally open two-blade contacts LHA, LHB, LHC and LHD and normally closed two-blade contacts LHE and LHF. Such contacts are released by a magnet 784LH similar to 784 which upon the circuit diagram will be designated 784LH. The restoring parts are the same construction as for the RH contacts and are operated from a cam similar to 177 fixed to LH reset gear 178LH.

*Punching mechanism*

In general the punching mechanism is of the successive column acting repetition punching type.

The punching mechanism generally is of the form shown in the Lee and Phillips United States Patent No. 1,772,186 and also of the form shown in the copending application of Lee and Daly, Serial No. 391,874, filed September 11, 1929 (British Patent No. 362,529). Certain features of the punch are also shown and more fully described in the copending application of George F. Daly, Serial No. 461,993, filed June 18, 1930. Other features of the punch are shown in patents to Schaaff, No. 1,803,979, dated May 5, 1931 and No. 1,821,078, dated September 1, 1931.

In general it may be stated that the punching mechanism is adapted to receive a record card in the receiving tray 118 (Figs. 1a and 3a), R designating the card in the receiving tray in this position (Fig. 3a). In such position the card is in proper position to be engaged by a pusher 550 mounted on a bracket which is carried by card feed rack 551. On the movement of the card feed rack 551 to the left from the position shown in Fig. 3a, the card is transferred by the pusher and card feed rack to an intermediate dotted line position R—1 (Fig. 3a). After the card reaches the R—1 position its further movement through the punching mechanism of the machine is effected by card carriage rack 552 which has suitable pusher fingers 563 (Fig. 3) attached to an arm carried by rack 552. The punching unit of the machine is provided with a separate driving motor M—2 (Fig. 3a). This motor through a shaft 553, drives a worm drive 554 which is adapted to drive a shaft 555, one end of which has secured thereto a ratchet shaped clutch element 562. Loosely mounted on shaft 555 is a gear 555a meshing with teeth on the underside of rack 551 and to which gear 555a is secured a disk 564. Pivoted on disk 564 is a member 566 provided with a ratchet shaped clutch tooth 567. Alongside of member 566 is another member 566b lacking the clutch tooth. On 566 is a pin 566c overlying an arcuate surface of 566b. The free end of 566b is connected to a toggle member 568 by a link 569. The member 568 is pivoted upon disk 564 at 570. The opposite end of 568 remote from its pivot 570 is connected to a spring element 571. The action of spring 571 is such that it tends to hold clutch tooth 567 out of engagement with the clutch teeth of clutch ratchet 562 or allow it to engage when 568 is shifted.

Figure 4:
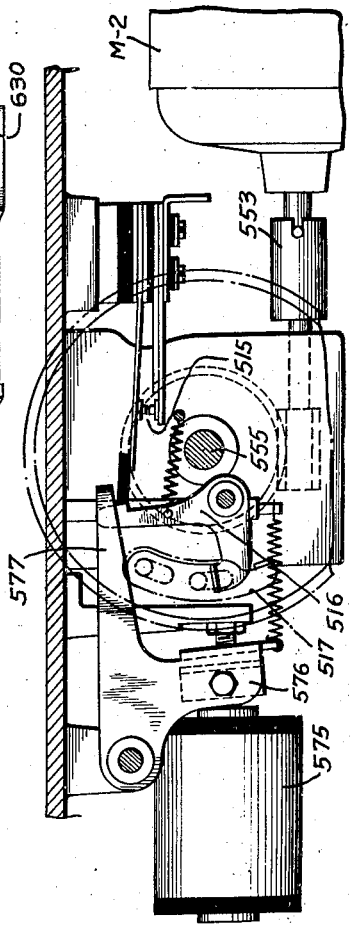
Fig. 4 is a sectional detail of certain parts of the punching mechanism.

For the purpose of effecting the clutching action, a clutch feed magnet 575 (Fig. 4) is provided and this magnet when energized attracts an armature 576 so that an arm 577 will engage the pin 578 (see Fig. 3a), upon part 566b depressing it and allowing 566 to descend so that the tooth 567 engages with the ratchet 562. The spring 566d connected to part 566 acts to hold the clutch tooth in engagement with the ratchet. Gear 555a will thereupon be driven in a counterclockwise direction substantially a single revolution, thereby shifting rack 551 to the left. It may also be mentioned that when magnet 575 is energized the arm 577 of the magnet will close contacts 515, such contacts being latched closed by a latch 516. Latch 516 is tripped to allow the contacts to reopen by a knock-off 517 carried upon the back of gear 555a (see Fig. 3a).

At the termination of the counterclockwise movement of gear 555a tails 579 of parts 566 and 566b (Fig. 3a) will strike a projection 580 on a fixed plate 581 to effect the disengagement of the tooth 567 from ratchet wheel 562 by a reversed action. This action will also restore toggle member 568 to its normal position. When such disengagement is complete, the spring drive of spring 583 in the barrel comes into action to rotate gear 555a clockwise and carry the tails 579 away from 580 and back to the position shown in Fig. 3a.

The mechanism just described is more fully described in the copending application of George F. Daly, Serial No. 461,993, filed June 18, 1930.

Gear 555a has intermeshed with it a gear 582, which gear is driven by the usual coil spring in barrel 583. Such coil spring is of the type customarily used in machines of this class and comprises a spring barrel with the coil spring connected to one end and also interconnected to the hub of gear 582. Gear 582 also intermeshes with the gear of the conventional governor device designated 583a.

Upon disengagement with the one revolution clutch 567 previously referred to, the rack 551 will return to the right under the influence of the coil spring 583. The previous movement of rack 551 to the left will have carried a record card from the R position to the R—1 position.

The driving train to the card carriage rack 552 will now be described.

Rack 551 has its upper teeth intermeshed with the gear 584 and the gear 584 is suitably supported for rotation and is secured to a member 585 having a single tooth in the plane of a pawl 586 pivoted to a plate 587 fixed to shaft 588 (see also Fig. 5). The opposite end of shaft 588 has fixed to it a gear 589 meshing with the card carriage rack 552.

To control the action of the clutching device (i. e. the co-action of pawl 586 with member 585) a camming element 590 is provided pivoted at 591 to the frame of the machine. This camming element 590 cooperates with the pin or roller 590a on the tail of the pawl 586. Rack 551 near its left hand end has fixed to it a block 592, which block is adapted to cooperate with another pin 593 carried by the pivoted camming element 590. With the rack 551 in extreme right hand position pawl 586 will be disengaged from the clutch element 585. Such disengagement is effected by the rocking of 590 in a clockwise direction, its camming surface cooperating with the pin or roller 590a on the pawl 586. Element 585 is fixed to gear 584 and accordingly during the initial movement of 551 to the left the block 592 will clear the pivoted camming element 590 allowing a slight counter-clockwise motion of it so that 586 under spring action may rock counterclockwise on the pivot so as to engage in the notch or tooth of member 585. Thereafter drive will come from 551, through cam 584, through member 585 to pawl 586 fixed to part 587, which in turn is fixed to shaft 588 so that a clockwise rotational movement will be imparted to 588. This action, through gear 589 will traverse the card carriage rack 552 to the right. The card carriage rack 552 will thus be shifted to extreme right hand position permitting the card pushers 563 to ride the surface of the card disposed under the pushers and ultimately engage back of the trailing edge of the card at the R—1 position. Rack 552 has associated with it a spring driving device comprising a spring barrel with an associated governor, the spring drive being generally designated 594 and the governor 594a. The rack 552 has also associated with it an escapement mechanism 595 having a dog 595a. This escapement is of the general type shown in United States patent to Schaaff, No. 1,426,223, dated August 15, 1922, and such escapement mechanism is also shown and described in the Lee and Phillips patent above referred to. Removably secured to the card carriage rack 552 is a skip bar 596. This skip bar is generally similar to the skip bar of the Lee and Phillips patent above referred to (see Fig. 28 of that patent), but differs in that with the skip bar is provided a notched portion 597 and according to the location and length of this notched portion, a skip lifter lever 598 is allowed to descend or remain in elevated position. If desired, a multiplicity of notches 597 may be provided in the skip bar for certain special operations. When the skip lifter lever drops in the notch 597, it allows dog 595a of the escapement mechanism to cooperate with the ratchet teeth of the rack 552. It will be understood that with the skip lifter lever 598 riding on the top of the skip bar 596 that the escapement will be disabled so that the card carriage rack can traverse without stopping at each card column until the notch 597 (or until a second notch) is encountered. Thereafter an intermittent motion of the card carriage follows under spring action and this intermittent action is controlled column by column under the control of the escapement mechanism until the skip lifter lever is again elevated by riding out at the end of the notch in the skip lifter bar 596. Skip bars of different configuration can be placed in the machine according to the kind and location of the punching on the record card.

It will be understood that with the above described skip bar construction that after the card is in the R—1 position (Fig. 3a) and engaged by the pushers 563 of the card carriage rack 552, that immediately thereafter the card will be traversed with a continuous motion to the left until the skip bar 598 comes into action to stop the card carriage. The card carriage will then be in the position for the beginning of punching.

The punching mechanism proper need not be fully described as it is fully set forth in the Lee and Phillips patent above referred to and in British Patent No. 362,529, which corresponds to the Lee and Daly United States application Serial No. 391,874. In brief, the punching mechanism comprises a number of punches 600, which punches are adapted to be depressed to actuate the card through interposers not shown under the control of the punch selector magnets. The details of the punching mechanism are also fully set forth in the copending application of George F. Daly and James M. Cunningham, Serial No. 576,184, filed November 19, 1931.

Referring to Fig. 3, disposed alongside the card carriage rack 552 and fixed to the frame of the machine, is a block of insulating material designated 611. Disposed in this block of insulating material are a number of spots 612 of conducting material and alongside these spots is a common strip of conducting material 613. A suitable bridging piece or multiple brush assembly 614 is carried by the card carriage rack 552 and as the card carriage rack moves the bridging brush 614 is displaced and establishes circuit connections from the common bar 613 to one of the spots 612 depending upon the columnar position of the card carriage rack 552. For accuracy of spacing, the conducting spots 612 are placed in two rows, the spots of the lower row being inter-staggered with the spots on the upper row as shown in Fig. 3.

Card ejector

Referring to Fig. 3, after the card has reached the R—1 position and has been traversed past the punches 600 and has been punched, it ultimately reaches a position at the extreme left hand end of the punching section of the machine from which point it must be discharged into a discharge hopper. The card eject mechanism is shown in Fig. 3 with the parts shown in the position which they assumed before the machine was started in operation. Upon the first card feeding operation through the punching section of the machine, rack 551 will have moved towards its extreme left position. After reaching the dotted line position shown in Fig. 3, 551 moves further to the left and thrusts a rack 630 to the left compressing coil spring 631. Bearing against a shoulder on rack 630 is a contact operating part 632. When 630 is thrust to the left, contacts P—3 which are previously closed will open under their own spring action. The displacement of rack 630 to the extreme left position will through intermediate gears 635, rock a shaft 636 in a clockwise direction to bring in ejector clip assemblage 637 away from the position shown in Fig. 3 to a position in which the ejector clip can receive a card which is advanced through the punching section of the machine. With the ejector clip assemblage 637 disposed in such card receiving position the assemblage will be latched in such position by a latch not herein shown, but which latch is fully described in British Patent No. 362,529 (see latch 216 of that patent, Fig. 16). The ejector clip latch is adapted to be released by an ejector clip magnet not shown in Figs. 3 and 4, but shown in the circuit diagram at 803, which magnet is also fully shown in the aforementioned British Patent No. 362,529. The action of the ejector assemblage may be briefly stated to be as follows. Upon energization of the ejector clip magnet, the ejector clip assemblage which has then grasped a card, swings from the card receiving position to the position shown in Fig. 3, in which position the jaws of the ejector are opened up so that the card can be discharged therefrom.

Contact devices of punching section of the machine

Contact devices P—3 controlled by 630 have been described. Also associated with the ejector end of the punching section of the machine are a pair of contacts P—4 which contacts are closed by their operating bail 633 being displaced anti-clockwise upon movement of 630 to the right and which contacts are allowed to open under their own spring action upon 633 being permitted to rock clockwise upon movement of 630 to the left hand position.

An extension 645 on rack 552 is adapted to close last column contacts P—2 when rack 552 has passed beyond the last card column position and to allow these contacts P—2 to open when the rack 552 moves to the right to any of its other positions.

Referring to Fig. 3a, 120 are card lever contacts previously described and controlled by card lever 119. Such contacts 120 are closed whenever a card is present in the R position. Also at the right hand end of the punching section of the machine are contacts P—1. These contacts are normally closed with the rack 551 in the position shown and such contacts automatically open up upon movement of 551 to the left from the position shown. They furthermore remain open during the complete traverse of 551 to the left and back to its starting position.

Also in the punching section of the machine there are controlling contacts P—5. These contacts are normally closed contacts and arranged to be opened upon the complete traverse of the rack 551 to the left. Opening of these contacts is effected by means of a portion of the bracket which carries the pusher 550.

*Cycle control and column shift*

For multiplying machines of this general type provision is required for shifting the columnar entries of partial products into various columns of the RH and LH accumulators. According to the present embodiment the multi-contact CS relays are used for switching the entries. It is also desirable to provide for cycle controlling for the elimination of unnecessary computing cycles. In particular the computing cycles which are to be eliminated are those cycles which would otherwise be made when a zero appears in some column or columns of the multiplier. According to the present embodiment a simplified cycle controller or zero column skipping arrangement has been provided. This cycle controller will be described in connection with the description of the circuit diagram.

*Circuit diagram*

Certain parts of the machine operation will now be described to explain certain of the improved circuits which are used in the present machine and to more particularly explain the improved circuits which provide an improved and simplified zero column skip or cycle controller action.

The first operation is to close the switch 760 (Fig. 15e) providing a source of current supply for the main driving motor M. Rotation of the motor M starts the drive of the A. C. D. C. generator 52 and supplies direct current to the D. C. buses or lines 761 and 762. Alternating current is likewise supplied to ground and to bus 763. Start key 764 is now depressed which completes a circuit from the 761 side of the D. C. line through relay coil C, through cam contacts FC—2 back to the 762 side of the D. C. line. With contacts FC—2 closed and upon concurrent operation of the start key 764 a stick circuit is established through the relay contacts C—1 through the stop key contacts 765 now closed and back through FC—2 to the other side of the D. C. line. Energization of coil C also closes relay contacts C—2 and a circuit is completed traced as follows. From the 761 side of D. C. line, contacts F—2 now closed, feed clutch magnet 766 (see also Fig. 1a), through cam contacts FC—6 now closed, relay contacts C—2 now closed, contacts LHF now closed, relay contacts L—2 now closed, through contacts RHF now closed, contacts P—1 which are on the punch rack and now closed and back to the other side of the line 762 through a circuit 768.

It may be explained that the contacts P—1 are only closed when the feed rack in the punching section of the machine is in the right hand position. This contact interlocking action is provided to prevent starting of the feed when the rack is not returned to proper position. Relay coil F is energized when a card is in the card tray of the punching machine. This coil is energized by the closure of card lever contacts 120 (Fig. 2) under the control of card lever 119. Energization of F opens relay contacts F—2 and prevents the starting of the feeding action if a card is disposed at the R position in the punching section of the machine at this time. The energizing of the circuit through relay F also serves to prevent continuance of machine operation if a card jams in the receiving tray of the punching section of the machine.

It has been explained before that the feed of the machine is arranged to permit the use of constantly running feed rolls in the machine for all feed rolls except those which are associated with the contact and card transfer roll 87. The arrangement of the feed is such that upon first starting up the machine when cards are first placed in the magazine, it is necessary to press down the start key after which the machine will run through four counter cycles to feed the first card. After the machine has been started and when it is in operation upon a run of cards only two counter cycles are required for card feed in the main card handling section of the machine. The first complete card feed cycle upon starting up the machine will advance the first card to a point where the X (first extra index point position of a card) will be in line with the special X brush 106 (Fig. 2), in which position the 9 index point position of the card will be about ready to pass under brushes 109. At the beginning of the second card feed cycle the card traverses the reading brushes 109 and the multiplier and multiplicand amounts are entered into the MP and MC receiving devices.

Figure 15B:
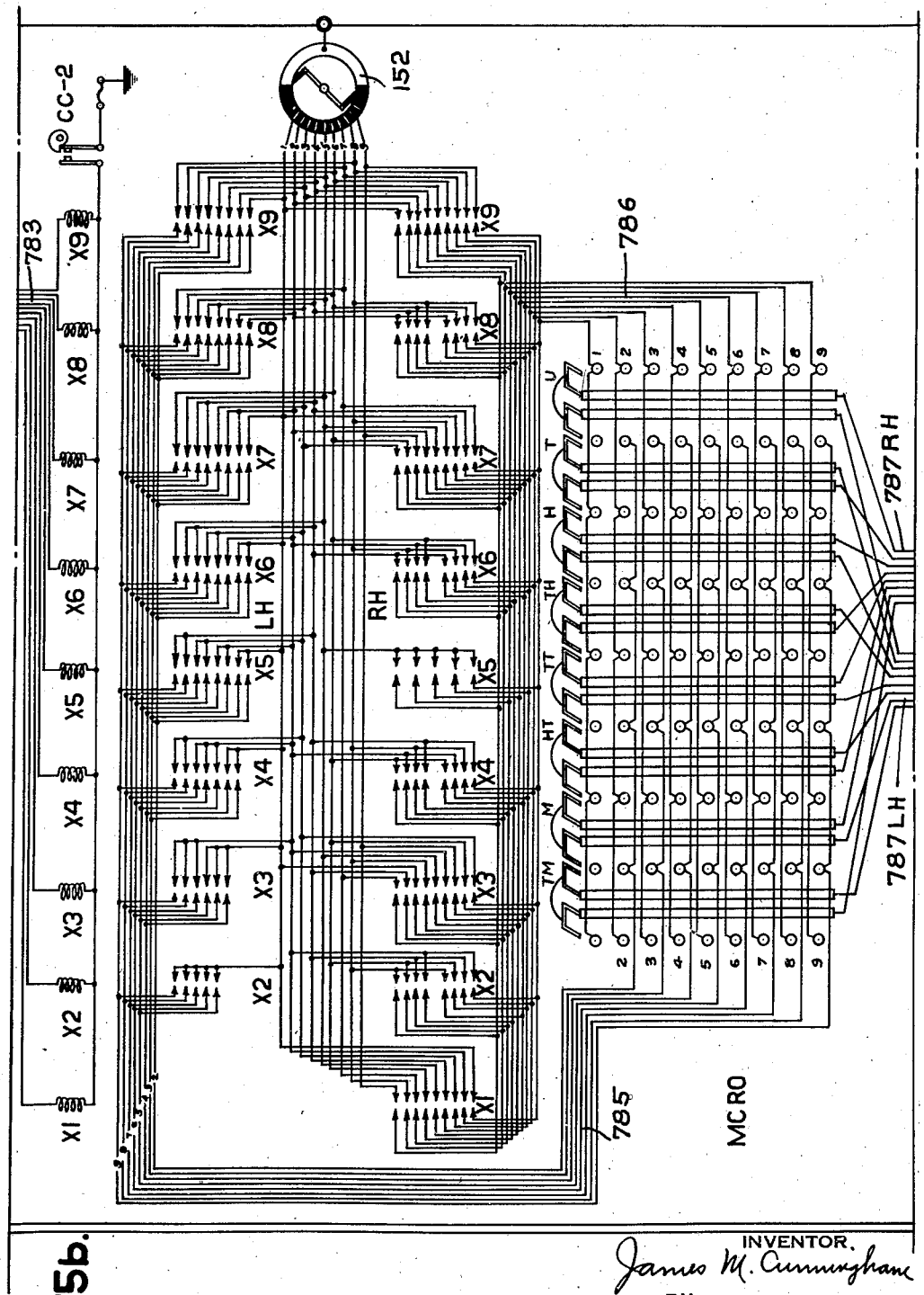
Figure 15C:
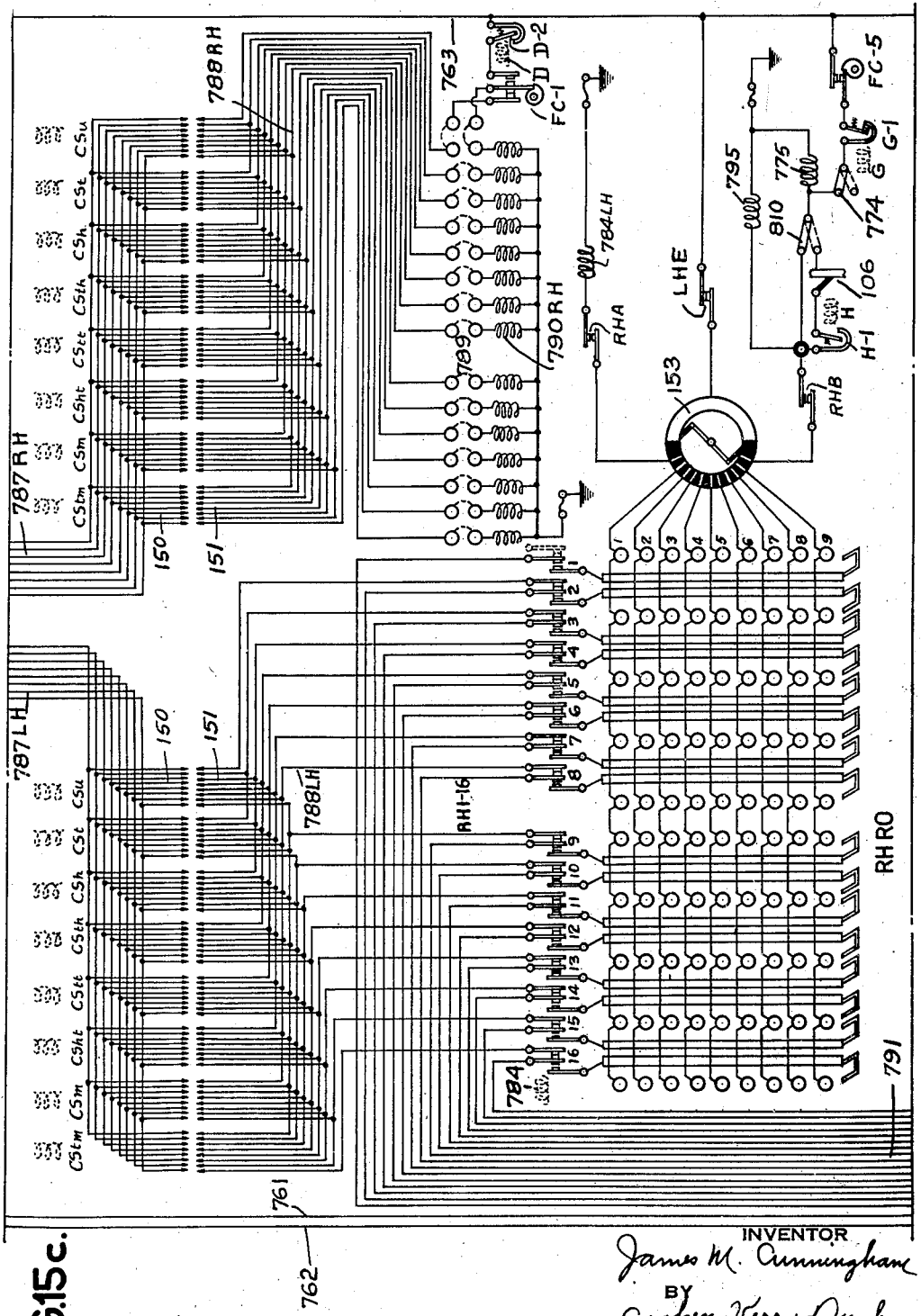
Figure 15D:
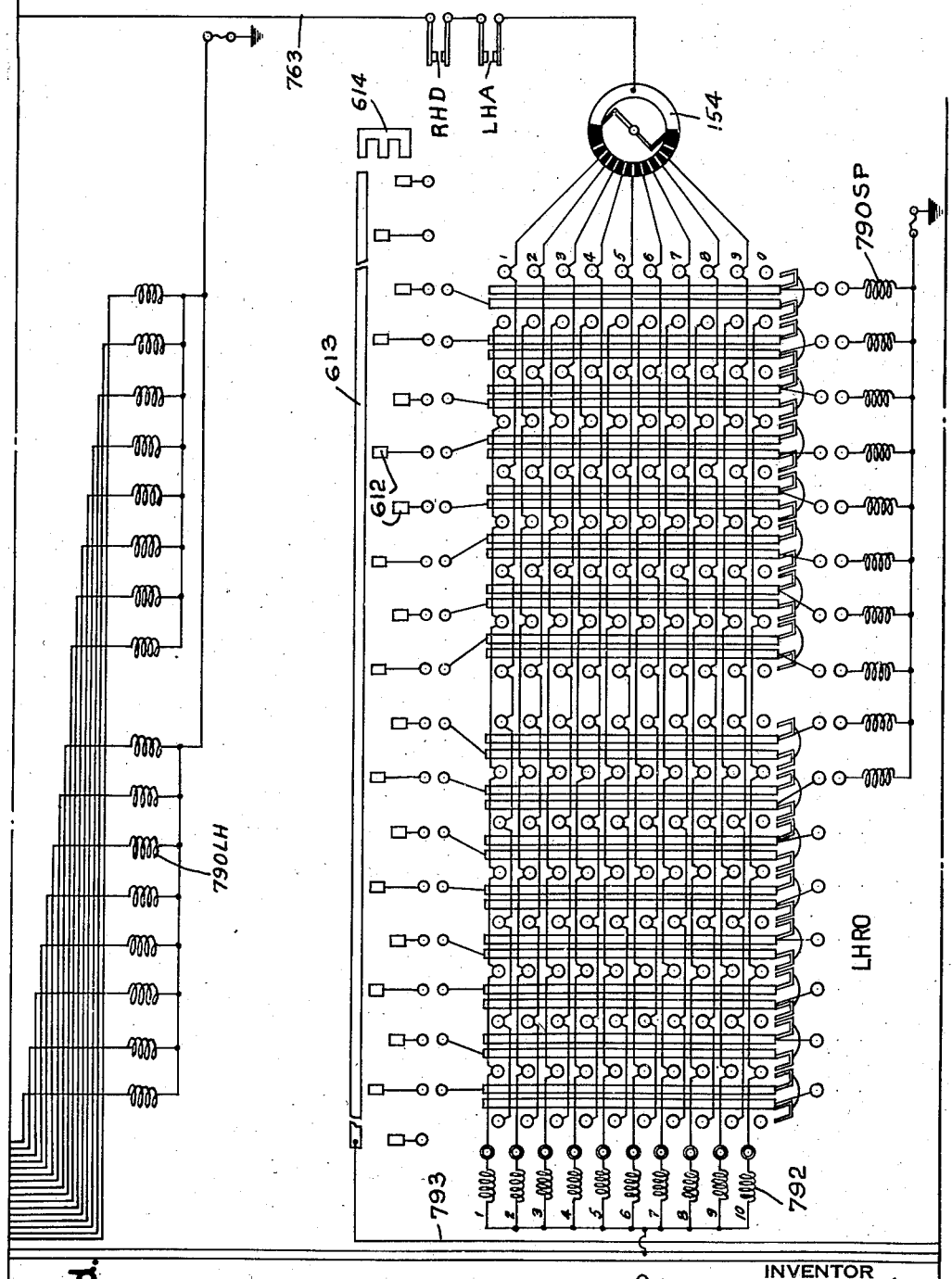
Figure 15E:
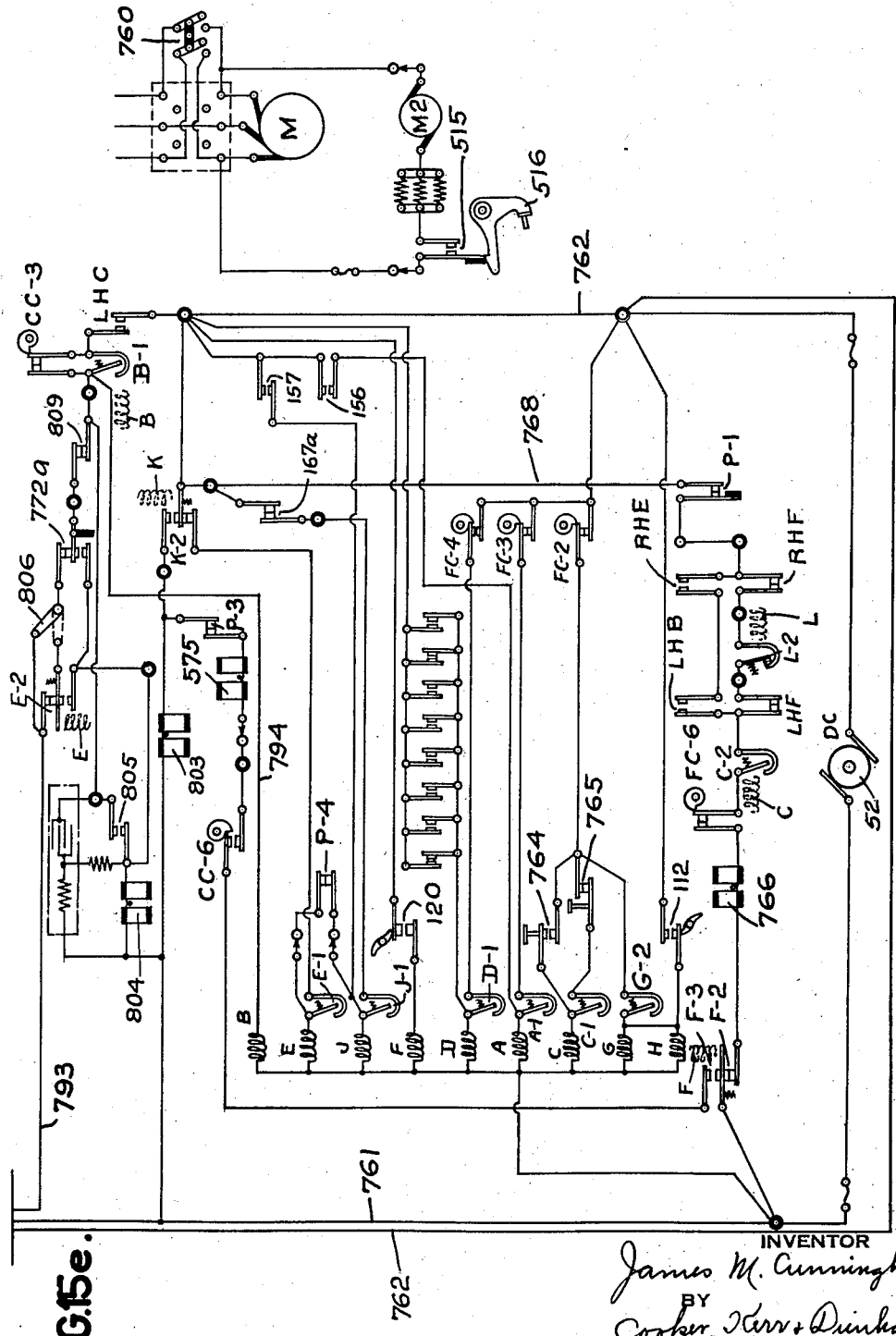

The entry circuits will now be traced. Card lever contacts 112 will now be closed energizing relay coil H (Fig. 15e). Energization of relay coil H closes contacts H—2 (Fig. 15a) and current accordingly flows from the 763 side of the A. C. line through H—2 now closed, through cam contacts FC—7 now closed, through the impulse distributor 155 and at the proper index points in the cycle of the machine to card transfer and conductor roll 87 through brushes 109 pertaining to the multiplier, these being designated 109MP on Fig. 15a, through the brushes 109 pertaining to the multiplicand designated 109MC and thence by plug connections from the 109MP brushes to the circuits extending to the counter magnets of the MP entry devices. Such counter magnets are conventionally designated 770. After passing the counter magnets upon normal multiplying operations, current flows back to ground from the multiplier magnets 770, through the relay contacts A—2 which are shifted during the entry of the multiplier into the machine. The contacts A—2 will be reversely thrown from the position shown in the circuit diagram (Fig. 15a) by energization of coil A (Fig. 15e). The manner of energization of coil A will be hereinafter described. The entry of the multiplicand amounts is effected in a similar manner. The counter magnets of the MC device are designated 771 on the circuit diagram and upon normal multiplying operations current flows back to ground from these magnets through a switch 811 which is in closed position.

In machines of this type it is desirable for checking purposes to reverse the multiplier and multiplicand. This can be conveniently effected by the provision of a multiple blade switch 772 which when thrown to reverse position from that shown, is adapted to direct the amounts from the 109MP brushes into the MC counter magnets 771 and to direct the amounts from the 109MC brushes into the multiplier entry receiving counter magnets 770.

By the foregoing entry operations, the multiplier amount and the multiplicand amount will be set up in the MP and MC entry receiving devices and the readout devices of the MC and MP readout devices will be correspondingly set. Fig. 15a shows diagrammatically the MP readout devices which are of the conventional commutator form and which are used in machines of this class. With these readout devices certain circuits are used to determine which of the columns of the multiplier contain zeros. It will be obvious that in any single column of the multiplier there will not be a set up of a zero and a significant figure concurrently.

It has been previously explained how coil H is energized. Upon energization of coil H another relay coil G is energized (see Fig. 15e) and energization of coil G picks up relay contacts G—2 and a circuit is completed through cam contacts FC—2 back to the other side of the line. It may be explained that relay coil G does not deenergize during the normal operation of the machine as the time of closure of contacts FC—2 overlaps the time when card lever contacts 112 are open. Relay coil H remains energized while coil G is energized by means of the holding circuit to G.

In the circuits previously traced, reference has been made to relay coil A (Fig. 15e). This relay coil A with its associated contacts A—2 shown on Fig. 15a and its coil shown on Fig. 15e is picked up by establishing another circuit through contacts 156 (Fig. 15e and Fig. 1) which closed upon the reset of the MP counter. Upon starting up the machine after cards have been completely run out of the machine and the power shut off, and before the MP receiving device receives amounts at the beginning of a card run, the MP receiving device is reset to complete the entry circuits to the MP counter magnets by the energization of relay coil A. This particular reset circuit is traced as follows. From A. C. line 763 (Fig. 15c) through cam contacts FC—5, relay contacts G—1, which are closed before the energization of coil G previously referred to, through switch 774 now closed, MP reset control magnet 775 (Fig. 1) and back to ground. Energization of the MP reset magnet 775 resets the MP receiving device in the usual way. This resetting operation also causes closure of contacts 156. A holding circuit through relay coil A is provided, the same extending through cam contacts FC—3 (Fig. 15e) and providing for current flow from the 761 side of the D. C. line through the relay contacts A—1 of the A relay.

The foregoing has described how the entry of the multiplicand and multiplier factors from the card are entered into the MP and MC receiving devices. Following the reading of the card amounts by the brushes 109, the card, is carried over by the various feed rolls into the tray of the punching section of the machine. As the card is carried into the tray of the punching section card lever contacts 120 close completing a circuit to relay coil F, which when energized closes the contacts F—3 and opens contacts F—2. The opening of contacts F—2 discontinues the main card feed and closure of contacts F—3 serves to initiate card feed in the punch in a manner to be hereinafter described.
Energization of F also closes contacts F—1.

In the punching section of the machine there is a last column contact P—2 (Fig. 15a) which is closed when the card is beyond the last column position in the punch. The closure of this contact P—2 causes a relay coil K (Fig. 15a) to be energized. The energization of relay coil K shifts contacts K—2 and K—3 to a reverse position from that shown on Figs. 15e and 15a and the shifting of the contacts K—2 allows current to flow through a path traced as follows. From the 761 side of the D. C. line (Fig. 15e), through contacts F—3 now closed, through CC—6 now closed, through a punch rack feed magnet 575 in the punching section of the machine, through contacts P—3 which are closed at this time and operated by the eject mechanism of the punch, through K—2 and back to the other side of the D. C. line. The energization of 575 causes the closure of contacts 515 (Fig.
15e) and brings the driving motor M—2 of the punching section of the machine into operation. It may be explained that the contacts 515 are latched closed by means of a latch device 516 and that such latch device 516 is released at a proper time in the operation of the punching section of the machine.

As the card leaves the card feeding unit and transfers over into the punching section of the machine, the actual operation of multiplication starts and it may be explained that this multiplying operation is performed concurrently with certain movements of parts of the punching section which need not be here described.

*Relay terminology*

Heretofore and hereinafter in the specification and claims the term "relay" will be used to designate both the relay magnet coil and the contact or contacts controlled thereby. The terms "relay magnet" or "relay coil" and "contacts" or "relay contacts" will be used to refer to the corresponding part or parts of the relay. The term "relay" will also be used to broadly refer to the electromagnetically tripped mechanically controlled and restored multi-contact relays which are used for multiplication control and column shift entry purposes and to the other relays which may be of the purely electrical type such as the relays with parts Yu, Yu—1, Yu—2, etc. or to the electromagnetically tripped and mechanically restored relays such as those comprising relay coil 784 and contacts RH—1 to 16, etc. When the multiplier and column shift entry switching relays are referred to broadly in certain cases, the magnet or relay coils of these relays will be referred to as a "control magnet". When emphasis is to be placed on the tripping function of such magnet, such magnet will be referred to as a "tripping control magnet". When the term "control magnet" is used it will be understood that the term is used in its broader sense covering not only a tripping magnet per se, but also a magnet of any type adapted to effect control, or bring about contact operation in any manner whatsoever through the energization of the magnet. The term "column shift control contacts" will be used to refer to the relay contacts (to be hereinafter described) CSu—3, CSt—3, etc., which have the function of controlling and effecting the energization of the Y relay coils under certain conditions. The relays which include relay coils Yu and Yt and contacts Yu—1, Yu—2, Yt—1 and Yt—2, etc., will be termed "cycle controlling relays" or "control relays" and other contacts Yu—1, Yt—1 will be termed "stick contacts" and their other contacts Yu—2, Yt—2, etc. will be termed "column transfer contacts".

Column skip and cycle controller

It has been previously explained that coil F was energized under control of the card lever contacts 120. Energization of F closes relay contacts F—1 (Fig. 15a) and at the time these relay contacts are closed certain controlling contacts RHC are also closed. On the circuit diagram the MP readout device is generally designated MPRO. The zero spots of this readout device are wired to the relay contacts F—1 by wire 781.

The cycle controller and zero column skipping arrangement will now be described. In the cycle controlling section of the machine there are a number of relay coils which will be respectively designated Yu, Yt, Yh, Yth, Ytt, Yht, Ym and Ytm. The suffix u, t, h, th, etc. designate the related columnar orders, u designates units, t designates tens and so on. All of the Y coils have two sets of relay contacts associated therewith. One set will be given the general suffix designation 1 and the other set the general suffix designation 2. For example Yu has associated with it relay contacts Yu—1 and it also has associated with it relay contacts Yu—2. A similar arrangement of relay contacts is provided for all of the various Y units on the various columns. The 1 set of contacts are for stick circuit purposes and the 2 sets of contacts are for column selection and column shift purposes. The CS relay coils previously referred to are also shown in Fig. 15a and they are respectively designated CSu, CSt, CSh, CSth, CStt, CSht, CSm and CStm. In addition to the multi-point column shifting entry switching control contacts which have been generally designated 150 and 151 in the previous description (see also Fig. 15c) each CS unit has additional control contacts which will be given the suffix reference numeral 3, that is CSu—3 are the extra control contacts which are adapted to be closed upon the energization of coil CSu, and so on for the other CS relays in the other columns. One pair of such extra contacts is shown generally at CS—3 in Fig. 6.

If any brush of the readout device stands upon a zero spot its corresponding Y magnet coil will be energized, current flowing from the D. C. line 762 through relay contacts K—3, relay contacts F—1, cam contacts CC—1 over via wire 781, to the zero spots of the readout device, then via the corresponding brush or brushes standing on a zero spot or spots and then to the respective circuits shown to the respective Y magnet coils. It will also be noted that with relay contacts K—3 and F—1 closed, and with cam contact CC—1 closed, a circuit will be established to relay coils L and N. Energization of L will establish a stick circuit from line 762 through contacts RHC (normally closed), relay contacts L—1 to relay coil L. Closure of relay contacts L—1 will also establish a circuit from D. C. line 762, through the RHC contacts and through L—1 to a circuit 782 which extends over and connects with one side of each of the CSu—3 to CStm—3 group of control contacts. The other side of these contacts are wired back to their respective Y magnet coils and therethrough to the other side of the D. C. line 761. Accordingly, when any Y magnet coil becomes energized due to a brush standing on a zero spot in its corresponding column, the energization of this particular Y magnet coil will close its corresponding Y—1 stick contacts and the Y magnet coil will remain energized through the current which flows over through line 782.

It will be assumed that no zero appears on the units column of the readout, but that zeros appear on the tens and hundreds column and that a significant figure appears in the thousands column. With this condition, coils Yh and Yt will become energized and will be held energized by their stick relay contacts Yh—1 and Yt—1. The energization of Yh and Yt will also shift contacts Yh—2 and Yt—2 to the reverse position from that shown. The stick circuit energization of the Y magnet coils will maintain these contacts Yh—2 and Yt—2 shifted. Yu—2 will not have been shifted because its corresponding coil Yu has not been energized. The same will also apply to the Yth—2 contact.

The machine is now ready to multiply by the amount in the units order of the multiplier. Initiation of multiplication is effected in the following manner. Upon the closure of the relay contacts K—3 and F—1 and cam contacts CC—1 as above described, a coil N is also energized which coil is in parallel with relay coil L. Energization of this coil N closes its relay contacts N—1 and current is allowed to flow from the A. C. line 763, through N—1, through the Yu—2 contacts which are in the position shown, down through the CSu relay coil and out via the brush which is standing say on the five spot of the readout in the units order, down through the fifth line of the group of wires generally designated 783 to the X—5 multiplying relay control magnet (see Fig. 15b). The time of flow of current in the path just traced is timed according to the closure of cam contacts CC—2 (Fig. 15b).

It will be accordingly appreciated that there is a concurrent energization of the CSu coil and the X—5 multiplier coil, since these control magnet coils are disposed in series relation. Energization of the X—5 magnet brings about multiplying computation and the energization of CSu directs the entries into the proper columnar orders of the RH and LH registers in a manner to be subsequently explained.

It has been previously explained that when the entry switching multi-contacts of the CSu relays close that an extra control contact pair CSu—3 is also closed. This closure of the CSu—3 contact pair which takes place as an incident to the flow of current to the X—5 magnet coil through coil CSu, causes the energization of the Yu relay coil, which relay coil it will be remembered, was not previously energized, because its corresponding readout brush did not stand on the zero spot. The energization of Yu then shifts the relay points Yu—1 and Yu—2 so that upon the succeeding multiplication by the next significant figure current flowing in through N—1 will be diverted by Yu—2 over to the Yt—2 set of contacts which are in the reverse position from that shown, thence over through the Yh—2 contacts which are in reverse position from that shown (since their coils Yt and Yh have been previously energized by their corresponding readout brushes standing on zero spots of the readout device) and over to the Yth—2 contacts which are in the position shown, since they have not been shifted by energization of Yth by a brush of the readout standing on a zero spot. The next multiplying current impulse then flows through N—1, through Yth—2, through CSth, over through the brush of the readout to the particular wire of the 783 group, say the seventh wire and down through the X—7 magnet coil and out to ground upon closure of cam contacts CC—2. This current flow will effect a concurrent energization of the X—7 magnet coil and the CSth magnet coil and the energization of CSth will make proper entry of amounts into the LH and RH accumulators at a shifted over columnar relation therein. Upon completion of the complete multiplying computation, cam contacts CC—4 close. At the time these contacts CC—4 close, all of the Y—2 set of contacts will have been shifted to reverse relation from that shown so that there is a circuit path from the 763 side of the A. C. line through N—1, through all of the Y—2 set of contacts, through CC—4 now closed, through relay magnet 784 which is in the RH accumulator and back to ground.

The manner of controlling the provision of the differentially timed multiplying impulses need not be traced in detail. It is sufficient to here state that the energization of the X magnet coils of the multiplying relays establishes their related contacts shown on Fig. 15b and at the proper time in the operation of the machine current impulses flow from the emitter 152 through the multiplying relay control contacts and such impulses flow over the lines generally designated 785 and 786 to the LH and RH sections of the multiplicand readout designated MCRO. The multiplicand readout device allows selected impulses to flow on to the LH component lines designated 787LH and to the RH component lines designated 787RH. The lines 787LH and 787RH (see Fig. 15c) extend down to the various points 150 of the CS relays, being wired as shown in Fig. 15c and the other points 151 of these relays, connect to LH lines 788LH and to 788RH, which latter lines through a plug board 789 connect to the counter magnets 790RH pertaining to the RH accumulator. The 788LH lines in place of extending directly to the LH accumulator extend to the RH2 to 16 contacts and such contacts when in the position shown in the circuit diagram allow the impulses flowing over the 788LH lines to flow directly to the counter magnets 790LH of the LH accumulator. In this way the partial products are entered into the LH and RH accumulators and as successive multiplying cycles ensue there is a selected circuit energization of the CS magnets to direct the entries into the proper and shifted orders of the accumulators.

After the multiplying computation is complete for a given problem the amounts in the RH accumulator are transferred over to the LH accumulator. This is brought about by energization of magnet coil 784 in the manner previously explained. Energization of magnet coil 784 shifts all of the RH1 to 16 contacts to the reverse position and subsequently upon the operation of emitter 153 impulses are emitted through the RHRO readout device and through the shifted RH1 to 16 contacts to the lines 791 which extend over to the LH accumulator magnets 790LH. At the completion of an emission of impulses by the 153 emitter the brush encounters the extra spot shown and through contacts RHA now closed, energize relay magnet 784LH. Energization of 784LH trips open contacts LHE as heretofore explained and the opening of these contacts prevents a further transferring over operation.

The complete product is now standing in the LH accumulator and subsequently this product is read out to the punch selector magnets 792 of the punching mechanism by means of the brush 614 which traverses spots 612 and common conducting strip 613 in the manner previously explained. A circuit 793 provides D. C. supply for the common strip 613. While the amount is being punched on the card a summary products accumulation may be entered into the summary products accumulator by means of the emitter 154 which emits impulses through the LHRO readout device to the summary products counter magnets 790SP. Current supply to the emitter 154 is provided through contacts RHD and LHA which are in series as shown and connected to A. C. line 763.

It will be understood that RHD are closed by the energization of 784 and that LHA are closed by the energization of 784LH.

Supply of current for the punch selector common supply circuit 793 is provided at the proper time in the operation of the machine in the following manner (see Fig. 15e). Upon energization of 784LH (see Fig. 15c) contacts LHC close. Then upon closure of cam contacts CC—3 current flows from 762, through LHC, through CC—3, via a circuit path 794 to relay coil B and back to the other side of the line. Energization of B closes the stick contacts B—1 and this provides a supply of current through the circuit at the top of Fig. 15e to 793. The controlling contacts in this circuit require no detail description in the present application. These particular circuits associated with 793 are those customarily used in punching machines of this class. Resetting of the MP and MC receiving devices is effected by the electric control shown on Fig. 15c and now to be described.

Upon the emitter 153 encountering the zero spot, current is supplied through contacts RHB which are closed upon the energization of 784. Accordingly, current flows back to ground through the MP reset control magnet 775 and through the MC reset control magnet 795. Upon the reset of the MC accumulator, contacts 800 (see Fig. 1) are closed. Closure of these contacts 800 (see Fig. 15a) energizes the RH reset control magnet 801RH and this RH accumulator is then reset in the usual manner. Control of the reset of the LH accumulator is effected in the following manner.

Referring to Fig. 15a, upon closure of last column contacts P—2 relay magnet coil K is energized. Energization of K closes relay contacts K—1 and upon closure of cam contacts CC—5 current flows through the LHD contacts which are now closed, through the LH reset control magnet 802LH and back to ground.

Supplementary circuits

There are certain other supplementary circuits which require no detailed description since they are more fully described in the copending application of George F. Daly and James M. Cunningham, Serial No. 576,184, filed November 19, 1931. Relay coil D (Fig. 15e) controls points D—1 and the circuits associated therewith are for use in connection with one-half cent pick-up operations. Other one-half cent controlling circuits are those shown on Fig. 15c including cam contacts FC—1 and relay contacts D—2 controlled by relay coil D.

On Fig. 15e, 803 is the card eject magnet. This eject magnet is called into action by the energization of coil K, which shifts three-blade contacts K—2 to reverse position from that shown. 804 is the customary main punch operating magnet and 805 are the customary contacts in the punch. In place of providing a supplemental hand operated switch as in the Daly and Cunningham application for cutting out the punch on checking operations, the punching action is suppressed by means of contacts 772a (see also Fig. 15a). Such three-blade contacts 772a are thrown to reverse position from that shown in Fig. 15e upon the shift of the multiplicand and multiplier reversing switch 772 (Fig. 15a).

The three-blade contacts E—2 (Fig. 15e) are shifted on constant multiplier operations by the energization of coil E. Coil E has also associated with it control stick contacts E—1. Relay coil J with its stick contacts J—1 also comes into operation on constant multiplier operations.

Several manual switches are provided viz. 806 which can be thrown to the position shown for normal multiplication and which is shifted to the dotted line position for rate card multiplying operations.

Contacts 809 (Fig. 15e) are the usual floating contacts on the punch (see Fig. 3). The switch 810 (Fig. 15c) is also provided, which switch when in the position shown is for normal multiplying operations and which switch when thrown to dotted line position controls rate card operations through the extra or X brush 106. The circuits to the X brush is via points H—1, which are closed by energization of coil H (Fig. 15e). Switch 811 (Fig. 15a) is kept in the position shown for normal multiplying operations and this switch is thrown to dotted line position for rate card operations. Switch 774 (Fig. 15c) is kept in the position shown for normal multiplications and is thrown to dotted line position for constant multiplier operations. Switches 806, 810, 811 are also thrown to the dotted line position for constant multiplier operations.

The summary products accumulator is reset by a hand operation of the summary products reset key which closes contacts 812 (Fig. 15a). Closure of such contacts and the closure of cam contacts CC—5 and contacts K—1 energizes summary products reset magnet 813 (Fig. 1).

The detailed operation of the aforesaid supplementary circuits need not be further set forth since they are fully described in the Daly and Cunningham application above referred to. It is only necessary to here point out that when the multiplicand and multiplier reversing switch 772 is thrown to a position to reverse the multiplier and multiplicand that it concurrently shifts contacts 772a to a position to suppress punching during checking by cutting off current supply to line 793.

*Cycle controller summary*

Summarizing, the advantageous features of the present novel cycle controller and zero column skip controller herein disclosed are as follows:

The control relay coils Y etc., viz. Yu to Ytm are energized concurrently for all of the columns of a multiplier in which zeros appear. Their stick circuits through contacts Yu—1 etc., are also established concurrently. Upon energization of these Y control relay coils, there is a concurrent shift of the related Yu—2 to Ytm—2 groups of control contacts. The cycle controller after having its control circuits set up for the zero columns then operates upon the first (lowest columnar order) significant figure column to effect multiplication by the digit in that column, and concurrently with the energization of the multiplying relay coil X there is an energization of CS which releases the related entry switching multi-contacts for directing the entry of the impulses into proper columnar orders of the accumulators. Concurrently with the shift of the entry switching multi-contact column shift contacts there is a concurrent closure and shift of the related CS—3 control contacts to direct current to the previously unenergized and related Y magnet coil so that it may then become energized to shift its related Y—2 group of control contacts. The cycle controller which forms the subject matter of the present invention employs no sequential switching devices, such as have heretofore been employed in cycle controllers of this class. Such sequential switching devices as used heretofore require a series of points in the cyclic time of operation of the machine for the possible closing of a series of circuits in succession. In lieu thereof in the present embodiment the control contacts CS—3 are provided. Such control contacts CS—3, when released for closure, shift at a certain and definite time in the cycle of the machine and the shift occurs at the same time whether the CS—3 control contacts relate to units, tens, or higher orders. Accordingly, no great numbers of index points nor degrees of movement of parts of the machine are required for control purposes. In short, the present controller requires the same time for operation irrespective of the number of columns which are to be controlled. The present cycle controller is adaptable for practically an indefinite number of columns since its functioning is in nowise related to the coordinated operation of a sequential switching device which has heretofore been used in cycle control, and which switching device required a substantial portion of a machine cycle for a complete switching cycle and which switching device required an increased number of control points for an increased number of columns upon which control work is effected. Such switching device, moreover, necessitated cyclic time for its operation which in duration was related to the number of columns to be controlled and increased therewith so as to set an upper limit on the number of columns which could be conveniently controlled. The present controller is in that respect independent of and unlimited by the number of columns to be controlled.

What I claim is:

1. A multiplying machine of the partial products type having multiplication controlling multi-contact relays, column shifting multi-contact relays, each of said relays having a control magnet therefor, a readout contact device for setting up a series circuit through a multiplication control relay magnet and a column shifting control relay magnet, electromagnetically-controlled column transfer contacts for selectively diverting current to said series circuit or to a series circuit including a column shifting control magnet of a higher order, and a set of control contacts associated with the column shifting control magnet of the first mentioned series circuit and adapted to be closed on energization of said column shifting control magnet for controlling the shifting of the electromagnetically controlled column transfer contacts.

2. A cycle controller for a multiplying machine, including control magnets for multi-contact column shift relays, a transfer contact device related to each of said control magnets and shiftable for selectively diverting current to the control magnet of a corresponding columnar order or to a control magnet of another columnar order and electrically operated means related to each of said control magnets and controllable thereby for automatically shifting its corresponding transfer contact device upon closure of the multiple contacts of the column shift relays.

3. A multiplying machine having a plurality of multi-contact column shifting relays, corresponding control magnets therefor, transfer contact devices settable to divert energizing current to a predetermined control magnet or to a control magnet of another columnar order, and electromagnetic means for setting said contact devices, said column shifting relays having sets of control contacts associated therewith under control of the aforesaid control magnets for controlling the said electromagnetic setting means.

4. A multiplying machine comprising a plurality of multi-contact column shifting relay devices adapted for individual selective release, a cycle controller for skipping columns of multipliers which contain zeros during multiplying operations, and means for controlling the operation of said cycle controller comprising supplemental control contacts associated with each multi-contact column shifting relay and controllable thereby with the other multiple contacts of the relay.

5. A cycle controller and zero skip device for multiplying machines and the like, including a plurality of column shifting relay control magnets, transfer contacts in circuit therewith for pre-selecting which of said magnets is to receive current, a plurality of cycle controlling relay magnets for shifting said contacts, circuits for controlling energization of said cycle controlling magnets in accordance with the columnar position of zeros in a multiplier or the like, and a set of control contacts associated with each of the column shifting control magnets for closing a circuit to the corresponding cycle controlling magnet to energize the same, each said last mentioned set of control contacts being controlled by energization of the corresponding column shifting control magnet.

6. A cycle controller for multiplying machines, having column shifting devices for controlling computing operations involving a plurality of columnar orders of a multiplier, each of said devices having a transfer control device therefor settable to control an associated column shifting device, and each of said transfer control devices having cycle controlling means for setting the transfer control device pertaining to the next significant figure in the multiplier in column shifting control position, said cycle controlling means being operable for setting a transfer control device, at the same point of time in each and every computing cycle of the multiplying machine, whereby column shift controlling is independent of and unlimited by the number of columnar orders to be computed.

7. A cycle controller for skipping zeros in columns of a multiplier in multiplying computations and for selectively controlling column shift actions with selective control means for controlling the column shift actions, said control means including devices which operate at relatively the same point of cyclic time for selective control purposes irrespective of the number of columns which are to be skipped over in the selective control of the column shift action, said cycle controller including means to initiate the effecting of a column shift action for each and every partial product entering operation.

8. A column shift controller for selectively controlling column shift actions of column shifting means in a multiplying machine, with selective control means for the column shifting means for controlling the column shifting action thereof, said control means including devices whose successive controlling operations occur after successively uniform time intervals for various selective column shift actions in skipping over a variable number of columns.

9. A cycle controller for skipping one or more columns in the multiplier in which a zero appears, said cycle controller including control means operable to effect a variable shift of one or more columnar orders under the control of a single impulse which is always applied at the same point of time in each and every computing cycle irrespective of the columnar orders to be controlled.

10. A cycle controller and zero column skip control for a multiplying machine wherein a column shift relay is provided and having an associated control relay with transfer control relay contacts controlled by such control relays, said controller and zero skip control including means for effecting energization of a previously unenergized control relay concurrently with the column shift action as effected by a related column shift relay and under its control whereby a saving of cyclic time for control purposes is secured.

11. A cycle controller for a computing machine with a plurality of control relay magnets and a plurality of sets of transfer control contacts respectively shiftable thereby, with timed means for energizing each of any of the plurality of the control relay magnets and for effecting corresponding shift of the related transfer contacts at the same time in the cycle of operation of the machine whereby the cycle control time may be shortened and may be the same for an indefinite number of columns.

12. In a cycle controller for multiplying machines or the like, a plurality of column shifting devices, each of said devices having a magnet for controlling the same, a transfer contact device settable to effect selective energization of one of said control magnets or of another of said control magnets, and an additional contact device for controlling setting said first mentioned contact device to effect energization of the second of said last mentioned control magnets, said additional contact device being operable under control of and concurrently with the operation of the column shifting device related to the first of said last mentioned control magnets.

13. In a multiplying machine provided with a commutator type of multiplier readout with two common segments for each columnar order, a zero spot for one of said segments, a multi-contact controlling column shift relay magnet wired to one of the aforesaid segments and a control relay with its magnet wired to the other segment and adapted to receive current upon brush means of the readout structure cooperating with the zero spot and with said last mentioned segment, and means coordinating the action of the control relay with action of the multi-contact column shift relay.

14. A multiplying machine provided with a commutator type of multiplier readout with brush means, two common segments for each columnar order and a zero spot for one of said segments and including a multi-contact controlling column shift relay magnet wired to one of the aforesaid segments and a control relay for the aforesaid column shift relay magnet with its magnet wired to the other segment which through the brush means cooperates with the aforesaid zero spot.

15. The invention set forth in claim 14 in which transfer contacts are provided controlled by the control relay magnet for diverting a current impulse away from the column shift relay magnet upon the brush means of a given column standing upon a zero spot and for directing a current flow to another control relay magnet.

JAMES M. CUNNINGHAM.